United States Patent
Xue et al.

(10) Patent No.: US 11,271,273 B2
(45) Date of Patent: Mar. 8, 2022

(54) ELECTRODE MEMBER, ELECTRODE ASSEMBLY AND SECONDARY BATTERY

(71) Applicant: CONTEMPORARY AMPEREX TECHNOLOGY CO., LIMITED, Ningde (CN)

(72) Inventors: Qingrui Xue, Ningde (CN); Zige Zhang, Ningde (CN); Miao Jiang, Ningde (CN); Jing Li, Ningde (CN); Wei Li, Ningde (CN); Xianwei Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/137,090

(22) Filed: Dec. 29, 2020

(65) Prior Publication Data

US 2021/0119303 A1    Apr. 22, 2021

Related U.S. Application Data

(63) Continuation of application No. 16/732,180, filed on Dec. 31, 2019, which is a continuation of application No. PCT/CN2018/118142, filed on Nov. 29, 2018.

(30) Foreign Application Priority Data

Aug. 2, 2018  (CN) .......................... 201821242185.7

(51) Int. Cl.
*H01M 50/531* (2021.01)
*H01M 10/058* (2010.01)
(Continued)

(52) U.S. Cl.
CPC ....... *H01M 50/531* (2021.01); *H01M 10/058* (2013.01); *H01M 50/172* (2021.01); *H01M 50/543* (2021.01)

(58) Field of Classification Search
CPC ............. H01M 50/531; H01M 50/543; H01M 50/172; H01M 10/058
See application file for complete search history.

(56) References Cited

U.S. PATENT DOCUMENTS

| 2015/0171462 A1* | 6/2015 | Hong ................ H01M 10/0431 429/1 |
| 2015/0372335 A1* | 12/2015 | Jung ................... H01M 50/531 429/152 |

(Continued)

FOREIGN PATENT DOCUMENTS

| CN | 200997416 Y | 12/2007 |
| CN | 206163592 U | 5/2017 |

(Continued)

OTHER PUBLICATIONS

Contemporary Amperex Technology Co., Limited, Extended European Search Report, EP 18923756.3, dated Jun. 25, 2020, 6 pgs.

(Continued)

*Primary Examiner* — Jimmy Vo
(74) *Attorney, Agent, or Firm* — Morgan, Lewis & Bockius LLP

(57) ABSTRACT

The present application relates to an electrode member, an electrode assembly and a secondary battery. The electrode member comprises an electrode body and a conductive structure that has a first portion having an active material and a second portion extending from the first portion. The second portion comprises a main portion and a transition portion provided between the main portion and the first portion, and a width of the transition portion larger than a width of the main portion. The conductive structure is welded with the second portion and extends along a direction away from the first portion. At least a part of a welding region formed by the second portion and the conductive structure is positioned at the transition portion, thereby (Continued)

avoiding the overcurrent area being significantly reduced by the main portion and ensuring that every position electric current passes through have a sufficient overcurrent area.

20 Claims, 4 Drawing Sheets

(51) Int. Cl.
*H01M 50/172* (2021.01)
*H01M 50/543* (2021.01)

(56) References Cited

U.S. PATENT DOCUMENTS

2016/0064720 A1    3/2016  Umeyama
2017/0047575 A1*   2/2017  Tsuji .................. H01M 4/04

FOREIGN PATENT DOCUMENTS

CN    207542313 U      6/2018
EP      2804239 A1    11/2014
KR   20120080391 A     7/2012

OTHER PUBLICATIONS

Contemporary Amperex Technology Co., Limited, International Search Report and Written Opinion, PCT/CN2018/118142, dated Apr. 29, 2019, 12 pgs.

English Machine Translation of CN207542313U (Year: 2018), 13 pgs.

Xue, Office Action, U.S. Appl. No. 16/732,180, dated Nov. 19, 2021, 13 pgs.

* cited by examiner

ELECTRODE MEMBER, ELECTRODE ASSEMBLY AND SECONDARY BATTERY

CROSS REFERENCE TO RELATED APPLICATIONS

This application is a continuation application of U.S. patent application Ser. No. 16/732,180, filed on Dec. 31, 2019 which is a continuation application of PCT/CN2018/118142, filed on Nov. 29, 2018, which claims priority to Chinese Patent Application No. 201821242185.7, filed with the National Intellectual Property Administration of the People's Republic of China on Aug. 2, 2018, all of which are incorporated herein by reference in their entirety.

TECHNICAL FIELD

The present disclosure relates to the field of energy storage device, and particularly relates to an electrode member, an electrode assembly and a secondary battery.

BACKGROUND

With the advantages of high energy density, friendly environment and the like, secondary batteries, such as lithium-ion batteries, have been widely applied to electronic devices, for example, mobile phones, laptops and the like. In recent years, in order to deal with environmental issues, petrol price issues and energy storage issues, application of the lithium-ion batteries has been rapidly expanded to petrol-electric hybrid electric vehicles, energy storage systems and the like.

With the development of the secondary battery, a new type of structure has been introduced to the main components of an electrode member in the secondary battery, that is, the electrode member comprises an electrode body, the electrode body is formed by stacking an insulating substrate and a conducting layer provided on an outer side of the insulating substrate. Specifically, the conducting layer comprises a first portion coated with an active material and a second portion extending from the first portion; a plurality of second portions are connected with a current collecting member.

SUMMARY

An electrode member in accordance with some embodiments comprises an electrode body and a conductive structure. The electrode body is a laminated structure and comprises an insulating substrate and a conducting layer provided on a surface of the insulating substrate. The conducting layer comprises a first portion having an active material and a second portion extending from the first portion; the second portion comprises a main portion and a transition portion, the transition portion is provided between the main portion and the first portion, and a width of the transition portion is larger than a width of the main portion. The conductive structure is welded with the second portion and extends along a direction away from the first portion, and at least a part of a welding region formed by the second portion and the conductive structure is positioned at the transition portion.

It is to be understood that both the foregoing general description and the following detailed description are exemplary only and are not restrictive of the disclosure.

Figure 1:
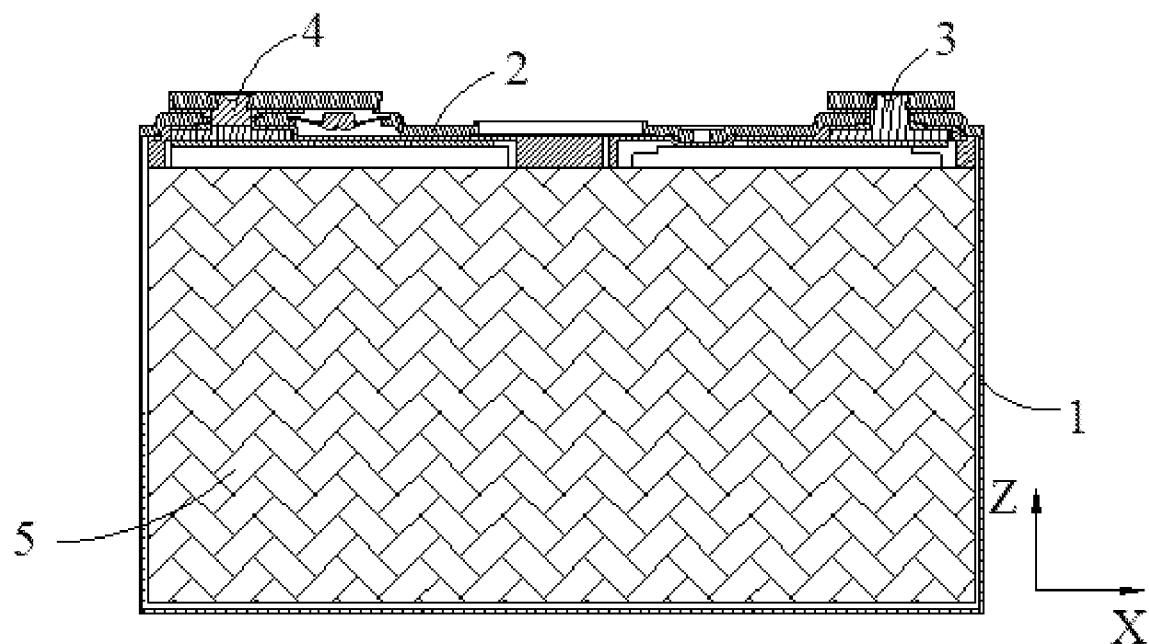
FIG. 1 is a structural schematic view of a specific embodiment of a secondary battery provided by the present disclosure.

REFERENCE NUMERALS IN FIGURES 1 case;
2 cap plate;
3 positive electrode terminal;
4 negative electrode terminal;
5 electrode assembly;
  51 electrode body;
    511 active material;
    512 insulating substrate;
    513 conducting layer;
      5131 first portion;
      5132 second portion;
        51321 main portion;
        51322 transition portion;
  52 conductive structure;
  53 welding region;
    531 first welding region;
    532 second welding region;
  54 insulating layer.

The accompanying figures herein are incorporated into and constitute a part of the description, which show embodiments in conformity with the present disclosure and are used to explain the present disclosure together with the description.

DETAILED DESCRIPTION

Hereinafter the present disclosure will be further described in detail by means of specific embodiments and in combination with the accompanying figures.

In the description of the present disclosure, it should be understood that, the orientation or positional relations indicated by orientation terms, such as "front", "rear", "up", "down", "left", "right", "transverse", "vertical", "perpendicular", "horizontal", "top" and "bottom", are usually based on the orientation or positional relations illustrated by the figures, and are only for facilitating description of the present disclosure and simplifying the description. Unless otherwise specified, such orientation terms do not indicate or imply that the device or element has to present a particular orientation or to be constructed and operated in a particular orientation, so that these orientation terms cannot be considered as limitation on the protection scope of the present disclosure. The orientation terms "inside" and "outside" mean the interior and exterior relative to the contour of various members themselves.

In the description of the present disclosure, it should be understood that, words such as "first", "second" and the like which are used to define the parts, are only intended to distinguish the corresponding parts. Unless otherwise specified, the aforementioned words do not have particular meanings, and thus cannot be understood as limitation on the protection scope of the present disclosure.

In addition, as shown in FIG. 1, a length direction of a secondary battery is defined as a length direction X, a thickness direction of the secondary battery is defined as a thickness direction Y, a height direction of the secondary battery is defined as a height direction Z.

As shown in FIG. 1 to FIG. 7, an embodiment of the present disclosure provides a secondary battery, which comprises a case 1, a cap plate 2, a positive electrode terminal 3, a negative electrode terminal 4 and an electrode assembly 5. The case 1 has an accommodating cavity; the cap plate 2 covers the case 1 to seal the accommodating cavity. The positive electrode terminal 3 and the negative electrode terminal 4 are provided to the cap plate 2. The electrode assembly 5 is provided inside the case 1.

The electrode assembly 5 comprises a positive electrode member, a negative electrode member and a separator which are stacked, the separator is provided between the positive electrode member and the negative electrode member, and the electrode assembly 5 can be formed by laminating or winding the positive electrode member, the negative electrode member and separator. When the electrode assembly 5 is accommodated in the case 1, the positive electrode member is connected with the positive electrode terminal 3, the negative electrode member is connected with the negative electrode terminal 4; the positive electrode member and the positive electrode terminal 3 can be connected by a current collecting member, the negative electrode member and the negative electrode terminal 4 can be connected by another current collecting member, so the electrode assembly and a component outside the secondary battery can be electrically connected via the positive electrode terminal 3 and the negative electrode terminal 4. The positive electrode member and the negative electrode member generally are plate structures, so the positive electrode member and the negative electrode members are respectively generally named as positive electrode plate and negative electrode plate.

Figure 3:
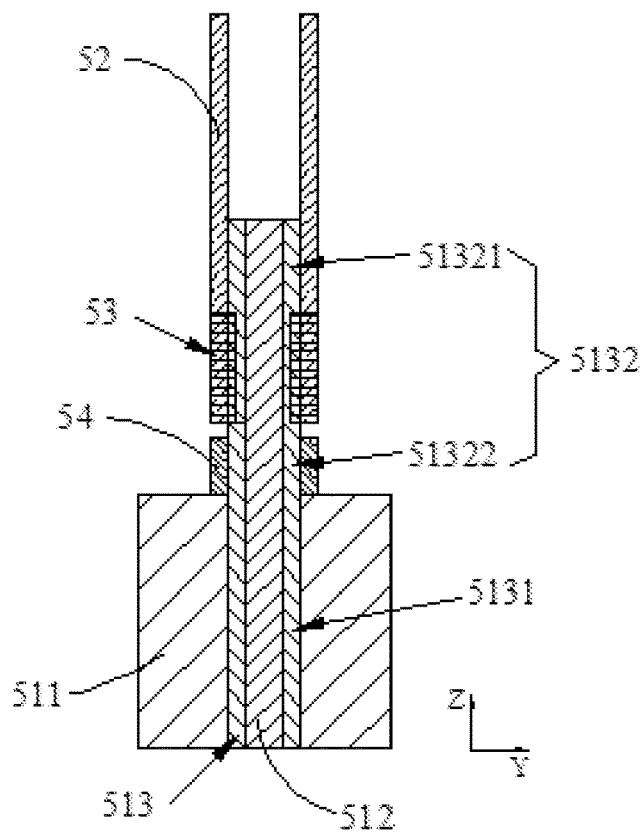
FIG. 3 is a cross sectional view of a specific embodiment of the electrode member provided by the present disclosure.

Referring to FIG. 3, at least one of the abovementioned positive electrode member and the abovementioned negative electrode member is an electrode member of any one of embodiments described later; in other words, only one of the positive electrode member and the negative electrode member is the electrode member described later, or each of the positive electrode member and the negative electrode member is the electrode member described later.

Figure 2:
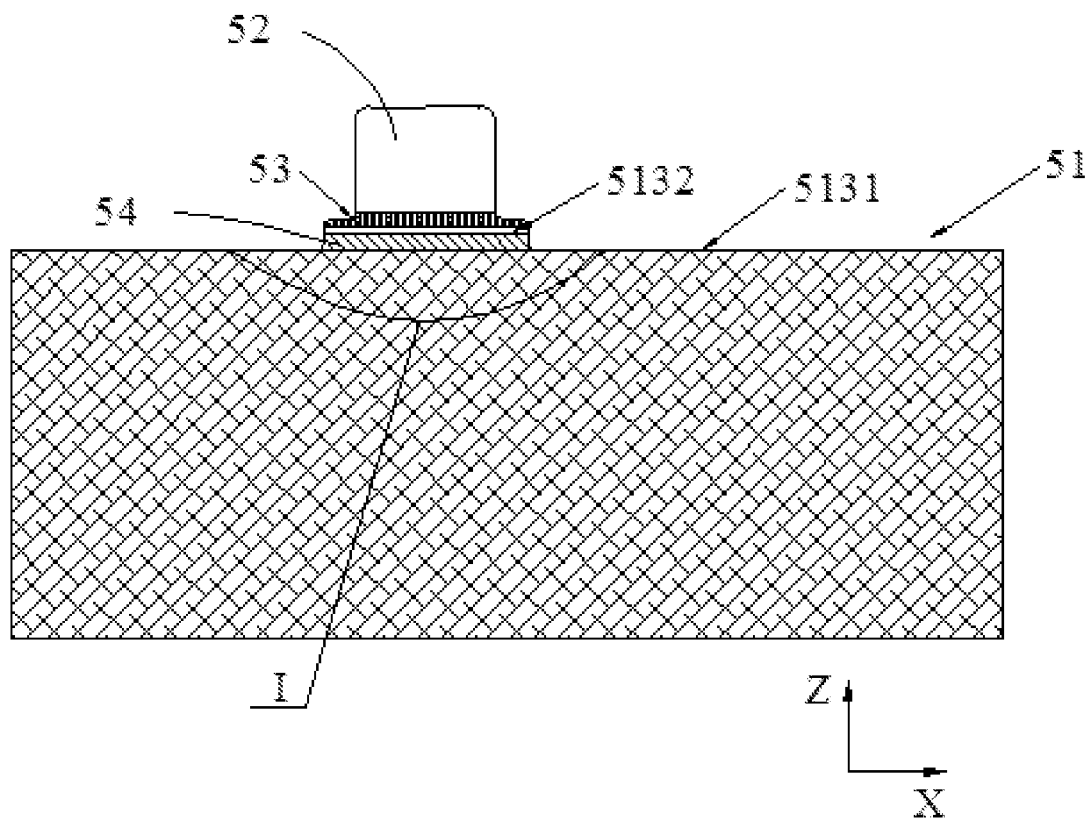
FIG. 2 is a structural schematic view of a specific embodiment of an electrode member provided by the present disclosure.

Referring to FIG. 2 and FIG. 3, the electrode member comprises an electrode body 51, the electrode body 51 is a laminated structure, and the electrode body 51 comprises an insulating substrate 512 and a conducting layer 513 provided on a surface of the insulating substrate 512. It can provide the conducting layer 513 at one side of the insulating substrate 512, or it also can provide the conducting layer 513 at both sides of the insulating substrate 512; FIG. 3 is a structural schematic view shown an embodiment providing the conducting layer 513 at both sides of the insulating substrate 512. The conducting layer 513 comprises a first portion 5131 and a second portion 5132, the first portion 5131 is provided with an active material 511, the second portion 5132 extends from the first portion 5131, and the second portion 5132 is not provided with the active material 511. The second portion 5132 comprises a main portion 51321 and a transition portion 51322, the transition portion 51322 is provided between the main portion 51321 and the first portion 5131, and a width of the transition portion 51322 is larger than a width of the main portion 51321. The abovementioned widths refer to dimensions in the abovementioned length direction X.

In the abovementioned electrode member, the width of the transition portion 51322 is larger than the width of the main portion 51321 in the conducting layer 513, to increase the connecting area between the first portion 5131 and the second portion 5132, thereby increasing the connecting strength between the first portion 5131 and the second portion 5132, and improving the reliability of the secondary battery. When the electrode member is formed by stacking the insulating substrate 512 and the conducting layer 513, a thickness (that is a dimension in the abovementioned thickness direction Y) of the conducting layer 513 is very small, so when the conducting layer 513 is connected with other member, the connecting position between the first portion 5131 and the second portion 5132 is especially easy to fracture. By using the electrode member of the present disclosure, it can increase a dimension of the connecting position between the first portion 5131 and the second portion 5132, and in turn improve the conducting layer 513's resistance to fracture at the connecting position. When the electrode member having such a stacked structure is applied to a secondary battery, because the thickness of the conducting layer 513 is smaller, the overcurrent area at the connecting position between the first portion 5131 and the second portion 5132 is very small, which may lead to heat being generated seriously at the connecting position and seriously reduce the performance of the secondary battery; by increasing the width of the transition portion 51322, it can enlarge the overcurrent area of the conducting layer 513 at the connecting position between the first portion 5131 and the second portion 5132, and in turn relieve heat generated at the connecting position in the process of using the secondary battery, and improve the performance of the secondary battery.

After the electrode assembly 5 is formed by electrode members, the second portions 5132 are connected. When two adjacent second portions 5132 are connected, the two adjacent second portions 5132 will be affected by the insulating substrate 512 between the two adjacent second portions 5132, and increase difficulty of electrical connection between the second portions 5132. For this reason, the electrode member of the present disclosure further comprises a conductive structure 52, the conductive structure 52 is connected with the second portion 5132 of the conducting layer 513 and extends along a direction away from the first portion 5131; at a side providing the electrode terminal in the abovementioned height direction Z, the conductive structure 52 extends beyond the second portion 5132. In this way, by providing the conductive structure 52, each electrode member can be directly connected via the conductive structure 52 when forming the electrode assembly 5; there is no insulating substrate 512 between two adjacent conductive structures 52, so each electrode member is easy to be electrically connected.

After the positive electrode member, the negative electrode member and separator are wound or laminated to form the electrode assembly 5, the second portions 5132 of the electrode assembly 5 are stacked; the second portions 5132 of the positive electrode member are stacked and connected with the conductive structures 52 of the positive electrode member to form a positive electrode tab; the second portions

5132 of the negative electrode member are stacked and connected with the conductive structures 52 of the negative electrode member to form a negative electrode tab. The positive electrode member is connected with the positive electrode terminal 3 via the positive electrode tab; the negative electrode member is connected with the negative electrode terminal 4 via the negative electrode tab.

Optionally, the conductive structure 52 is connected with the conducting layer 513 by welding; specifically, in some embodiments, the welding is ultrasonic welding, such as rolling welding or transfer welding. In an embodiment, a welding region 53 formed by the conductive structure 52 and the conducting layer 513 is completely positioned at the main portion 51321. However, after this electrode structure is applied to the secondary battery, the electric current of the electrode assembly 5 can be conducted to the conductive structure 52 after flowing through the transition portion 51322 and the main portion 51321 sequentially; the width of the main portion 51321 is smaller than the width of the transition portion 51322, and the overall thickness of the conducting layer 513 is very small relative to the conductive structure 52, so an overcurrent area at the main portion 51321 is significantly reduced compared to an overcurrent area of other region, and a resistance of a constituent region of the main portion 51321 will be increased, which leads to the constituent region generating heat seriously.

The present disclosure provides an embodiment, wherein at least a part of the welding region 53 formed by the conductive structure 52 and the conducting layer 513 is positioned at the transition portion 51322; in other words, the conductive structure 52 extends to the transition portion 51322 at a side close to the first portion 5131, and the conductive structure 52 at least is connected with the conducting layer 513 at the transition portion 51322. In this way, when the electrode member is assembled to form the secondary battery, the electric current of the electrode assembly 5 sequentially flows through the transition portion 51322, the welding region 53 and the conductive structure 52, and does not need to flow through the main portion 51321, so it can avoid the overcurrent area being significantly reduced caused by the main portion 51321, and ensure that every position the electric current passing through has a sufficient overcurrent area, and in turn improve the safety of the secondary battery. In the present disclosure, the welding region 53 formed by the conductive structure 52 and the conducting layer 513 is provided at the transition portion 51322, because the width of the transition portion 51322 is larger than the width of the main portion 51321, compared to one way of only providing the welding region 53 at the main portion 51321, this way can significantly increase the connecting area between the second portion 5132 and the conductive structure 52, and improve the strength of the conducting layer 513 at the second portion 5132, thus when the electrode assembly 5 is formed by winding the electrode members or stacking the electrode members, it can reduce the flex of the second portion 5132, and improve the quality of the electrode assembly 5.

Figure 4:
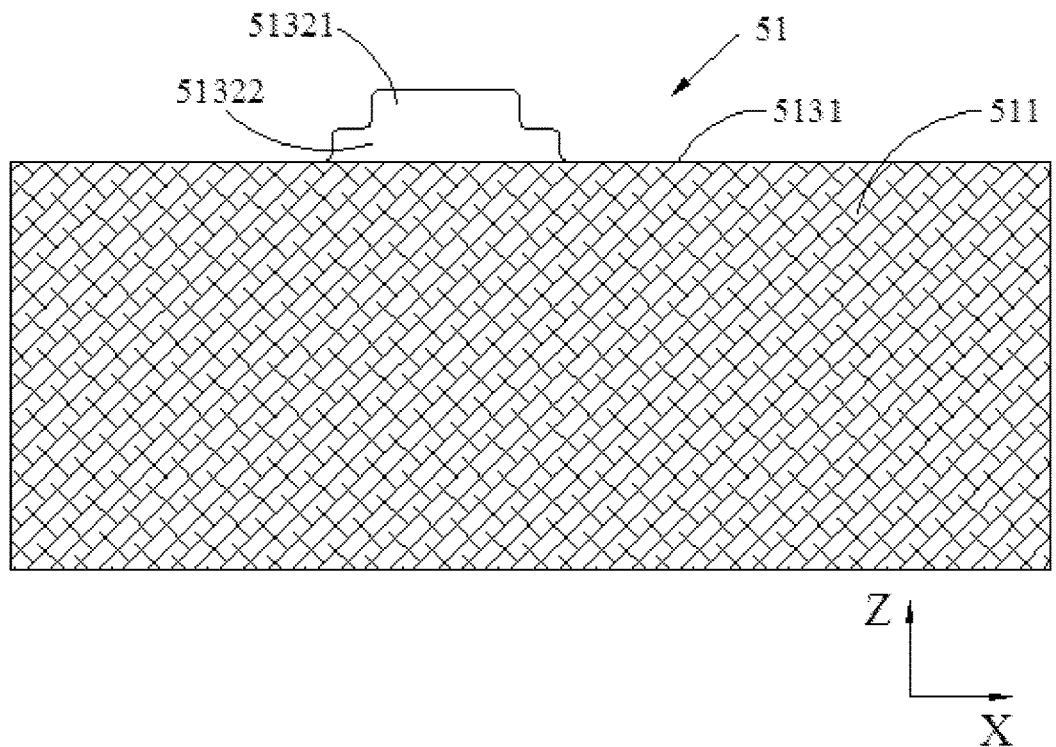
FIG. 4 is schematic view of a specific embodiment of an electrode body of the electrode member provided by the present disclosure.

Understandably, in some embodiments, in a projection along the abovementioned thickness direction Y, a width of the second portion 5132 is changed continuously and smoothly along the abovementioned height direction Z; for example, the second portion 5132 is a triangular structure, a trapezoidal structure, a stepped structure or the like. In an embodiment, the second portion 5132 is a stepped structure; as shown in FIG. 4, the second portion 5132 has a large end and a small end connected with each other, an area of a cross section of the large end is larger than an area of a cross section of the small end, the cross section is a section perpendicular to the height direction Z. A stepped surface is formed at a side of the large end close to the small end, at this time, the main portion 51321 is provided to the small end of the stepped structure, the transition portion 51322 is provided to the large end of the stepped structure, the stepped surface is away from the first portion 5131; by using this structure, on the premise that a height (a dimension along the abovementioned height direction Z) of the second portion 5132 is constant, it can make the width of the transition portion 51322 larger, and in turn better increase the connecting reliability between the second portion 5132 and the first portion 5131. In this way, the main portion 51321 is provided to the small end, which can increase the width of the transition portion 51322 and make the width of the main portion 51321 smaller, thereby avoiding the second portion 5132 affecting the function of the other member when the second portion 5132 is connected with the other member. For example, after the second portion 5132 forms the electrode tab, the electrode tab can be connected to the electrode terminal via a current collecting member; in order to improve the safety of the secondary battery, the current collecting member is provided with a fuse hole in some embodiments; when the electric current in a circuit formed between the electrode terminal and the electrode assembly 5 is too high, the current collecting member can be fused rapidly at the fuse hole. At this time, if the width of the main portion 51321 is too large, it may cover the fuse hole, thereby affecting the reliability of the fuse hole, even leading to the failure of the fuse hole, and reducing the safety of the secondary battery. By using the abovementioned stepped structure, it can increase a difference between the cross section of the main portion 51321 and the cross section of the transition portion 51322, and in turn avoid the abovementioned problem.

In an embodiment, the second portion 5132 is connected with the first portion 5131 via a rounded corner; obviously, such a stepped structure can better increase the overcurrent area of the second portion 5132.

It should be noted, in some embodiments, the abovementioned large end and the abovementioned small end each are a rectangle structure, a triangular structure, a trapezoidal structure or combination thereof.

Further, at least one side of the second portion 5132 in the abovementioned length direction X, the transition portion 51322 and the main portion 51321 is connected via a rounded corner. The transition portion 51322 and the main portion 51321 can be connected via rounded corners at two sides of the second portion 5132 in the abovementioned length direction X, or be connected only via one rounded corner at one side of the second portion 5132 in the abovementioned length direction X. By configuring the second portion 5132 in the abovementioned way, it can prevent stress concentration after forming the second portion 5132, and improve the reliability of the second portion 5132.

In order to facilitate the structure configuration of the electrode assembly 5 and the arrangement of the electrode assembly 5 in the inner space of the secondary battery, the electrode tab formed by the second portion 5132 and the conductive structure 52 is symmetrical with respect to a central surface. The central surface is a plane of the second portion 5132 parallel to the height direction Z and the thickness direction Y.

Figure 5:
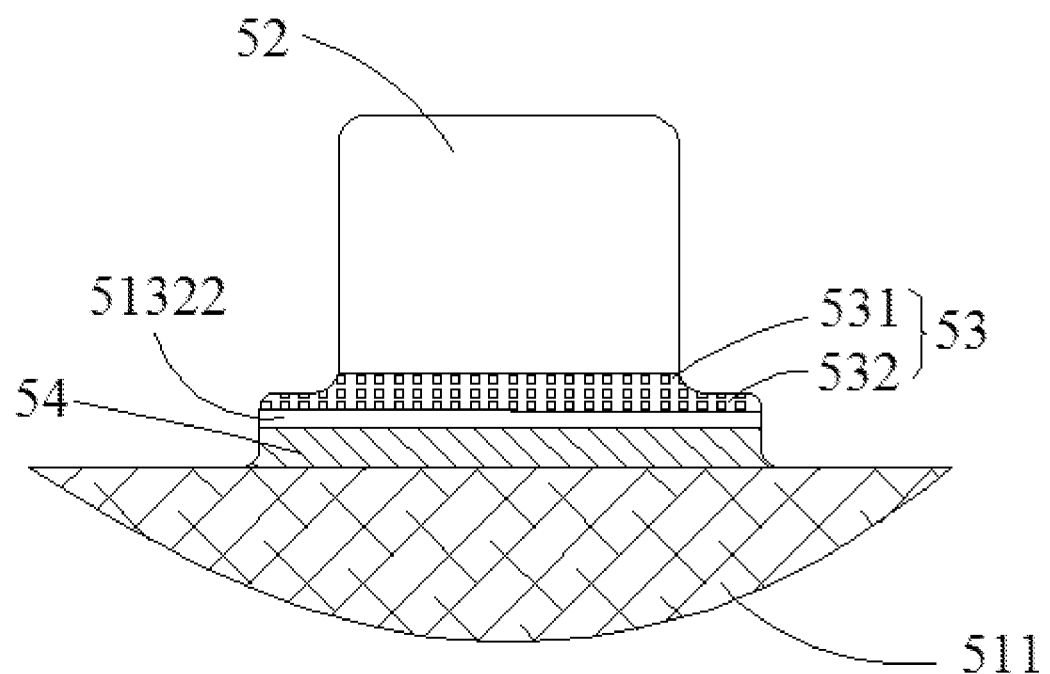
FIG. 5 is a partially enlarged view illustrating a portion "I" of FIG. 2.
Figure 6:
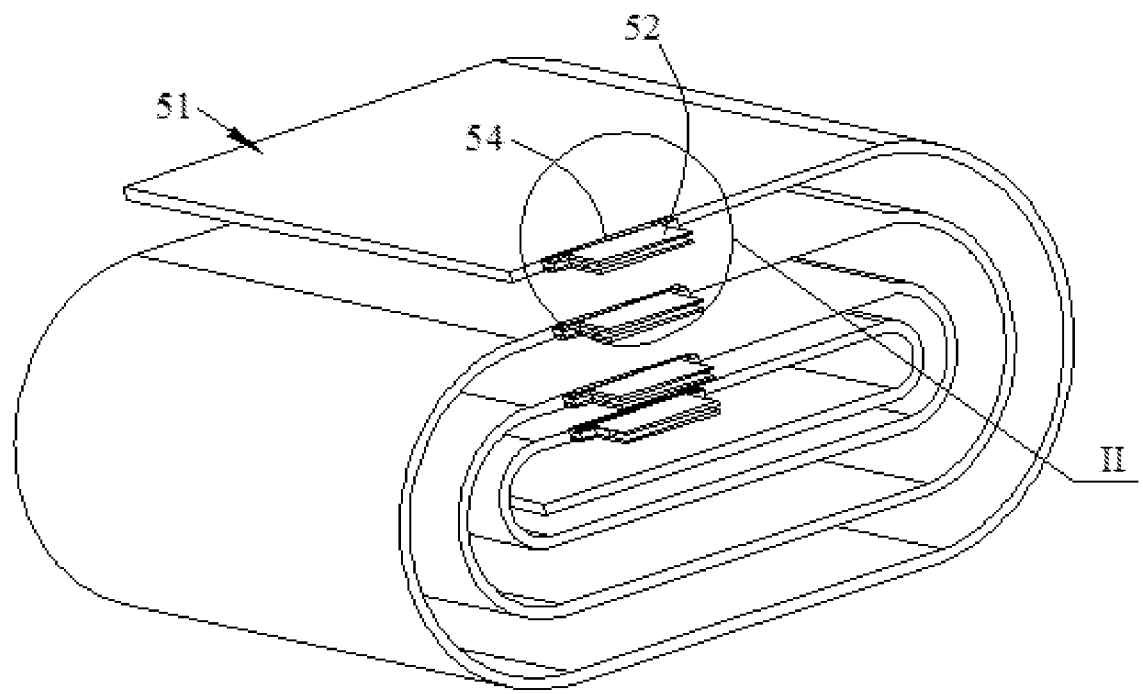
FIG. 6 is a schematic view of a specific embodiment of the electrode member provided by the present disclosure.
Figure 7:
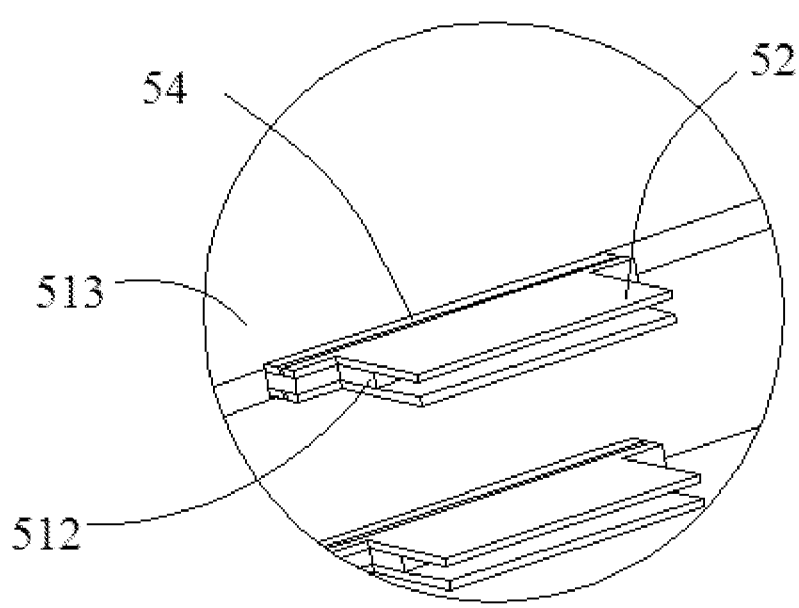
FIG. 7 is a partially enlarged view illustrating a portion "II" of FIG. 6.

In an embodiment of the present disclosure, the abovementioned welding region 53 is further positioned at the main portion 51321, that is, the conductive structure 52 is welded with the conducting layer 513 at the main portion 51321 and the transition portion 51322. Specifically, as shown in FIG. 5, the welding region 53 comprises a first welding region 531 and a second welding region 532, the first welding region 531 is positioned at the main portion 51321, the second welding region 532 is positioned at the transition portion 51322, so it not only can ensure a welding area between the conductive structure 52 and the second portion 5132, but also can decrease a height (that is a dimension in the abovementioned height direction Z) of the transition portion 51322, and in turn reduce the space of the secondary battery occupied by the electrode assembly 5. By decreasing the height of the transition portion 51322, it also can reduce creases when bending the electrode tab, and improve the energy density of the secondary battery. At the same time, it can decrease the overall height of the second welding region 532 in this way, so it also can prevent a short circuit caused by the separator pierced by the welding region. Especially, when the positive electrode member uses this electrode member, because a length of the negative electrode member is generally larger than a length of the positive electrode member, if the welding region pierces the separator and contacts the negative electrode member, it will lead to short circuit; by using the welding region 53 provided at the main portion 51321 and the transition portion 51322 at the same time, it can avoid the separator being pierced by the welding region as far as possible, and improve the safety of the secondary battery. The abovementioned lengths refer to dimensions in the length direction X.

Further, a width of the second welding region 532 is larger than a width of the first welding region 531, so as to increase an area at the connecting position between the transition portion 51322 and the conductive structure 52, and in turn improve the safety of the secondary battery; at the same time, it can increase the connecting strength between the second portion 5132 and the conductive structure 52, and improve the reliability of the secondary battery. The abovementioned widths refer to dimensions in the length direction X.

Further, a height of the second welding region 532 is 0.5 mm-2.5 mm, that is, a dimension of the second welding region 532 in the abovementioned height direction Z is 0.5 mm-2.5 mm; for example, the height of the second welding region 532 is 0.5 mm, 0.8 mm, 1.0 mm, 1.5 mm, 2.0 mm, 2.2 mm or 2.5 mm. By configuring the height of the second welding region 532 in the abovementioned range, it can better prevent the short circuit caused by the separator pierced by the welding region, and improve the safety of the secondary battery.

If a height of the first welding region 531 is too long, it will lead to the electrode tab of the electrode member having a longer length, thereby increasing a probability that the electrode tab inserts into the electrode assembly 5. In an embodiment, the height of the first welding region 531 is smaller than 3 mm, that is, a dimension of the first welding region 531 in the abovementioned height direction Z is smaller than 3 mm; for example, the height of the first welding region 531 is 2.9 mm, 2.6 mm, 2.3 mm, 2 mm, 1.5 mm or the like. After configuring like this, in the assembling process of the secondary battery, it can decrease the redundancy of the first welding region 531, reduce the probability that the redundant part inserts into the electrode assembly 5, and in turn further improve the safety of the secondary battery.

When the second portion 5132 is welded to the conductive structure 52, the generated vibration amplitude is larger; if the distance between the welding region 53 and the first portion 5131 is too small, even the welding region 53 and the first portion 5131 are directly connected, the active material 511 on the first portion 5131 may fall off due to the vibration. In order to solve the problem, a gap is kept between the welding region 53 and the first portion 5131 in the present disclosure, so as to avoid the conductive structure 52 and the active material 511 on the first portion 5131 falling off due to the vibration, and in turn improve the reliability of the electrode assembly 5.

In addition, the electrode member further comprises an insulating layer 54, the insulating layer 54 is provided in the abovementioned gap. As shown in FIG. 3, the insulating layer 54 can be provided at an outer side of the conducting layer 513 by coating or plating process, so as to enlarge a hardness of the connecting position between the transition portion 51322 and the first portion 5131, increase the connecting position's resistance to bend, thereby improving the reliability of the secondary battery.

Further, in each abovementioned embodiment, both of two ends of the welding region 53 in the length direction X extend to edges of the second portion 5132. As shown in FIG. 2 and FIG. 5, in a projection along the abovementioned thickness direction Y, a part of the conductive structure 52 overlapped with the second portion 5132 and a part of the second portion 5132 overlapped with the conductive structure 52 have the same profile, so as to configure the overall electrode assembly 5 conveniently and improve the overall energy density of the secondary battery. Understandably, the conductive structure 52 extends to a side of the welding region 53 away from the first portion 5131, as shown in FIG. 3, the conductive structure 52 extends beyond the second portion 5132 at a side away from the first portion 5131, a part of the conductive structure 52 beyond the second portion 5132 is defined as an extending portion, each electrode member is connected via the extending portion; obviously, this way can make the area of the welding region 53 increase as far as possible, and maximize the area of the welding region 53 on the premise that a height of the welding region 53 is constant; this way has a simple structure and can be connected conveniently. In some embodiments, the extending portion is a rectangle structure, a triangular structure or a trapezoidal structure; in order to conveniently connect the conductive structure 52 with the electrode terminal or the current collector, the part of the conductive structure 52 beyond the second portion 5132 is a rectangle structure.

When both sides of the insulating substrate 512 are provided with the conducting layers 513, each conducting layer 513 is connected with the conductive structure 52 in some embodiments; two conductive structures 52 of one electrode member can be connected via the abovementioned extending portions. When the electrode assembly 5 is connected to the electrode terminal, the electrode assembly 5 can be connected with the electrode terminal via the extending portion.

Furthermore, the embodiments of the present disclosure further provide an apparatus, which includes a secondary battery according to any one of the embodiments as described above, wherein the secondary battery is adapted to provide power for the apparatus. The apparatus may be an electric vehicle, a hybrid vehicle, an electric scooter, an electric cart or any other suitable devices which can include the battery pack as their own power source.

The above descriptions are merely exemplary embodiments of the present disclosure, but are not intended to limit the present disclosure. For a person skilled in the art, the present application may have a variety of modifications and changes. Any modification, equivalent replacement, and improvement made without departing from the spirit and principle of the present disclosure shall fall within the protection scope of the present disclosure

What is claimed is:

1. An electrode member, comprising an electrode body and a conductive structure;
   the electrode body being a laminated structure and comprising an insulating
   substrate and two conducting layers provided on two opposite surfaces of the insulating substrate;
   each conducting layer comprising a first portion and a second portion extending from the first portion, the first portion being coated with an active material, and the second portion being not coated with the active material;
   the second portion comprising a main portion and a transition portion, the transition portion being provided between the main portion and the first portion, and a width of the transition portion being larger than a width of the main portion; and
   the conductive structure being welded with the second portion and extending along a direction away from the first portion, and at least a part of a welding region formed by the second portion and the conductive structure being positioned at the transition portion.

2. The electrode member according to claim 1, wherein the welding region comprises a first welding region and a second welding region, the first welding region is positioned at the main portion, the second welding region is positioned at the transition portion; and
   a width of the second welding region is larger than a width of the first welding region.

3. The electrode member according to claim 2, wherein both of two ends of the welding region in a width direction of the second portion extend to edges of the second portion.

4. The electrode member according to claim 2, wherein a dimension of the first welding region is smaller than 3 mm, and a height of the second welding region is 0.5 mm-2.5 mm.

5. The electrode member according to claim 1, wherein the second portion is a stepped structure, the main portion is provided to a small end of the stepped structure, and the transition portion is provided to a large end of the stepped structure.

6. The electrode member according to claim 5, wherein at least at one side of the second portion in a width direction of the second portion, the transition portion and the main portion is connected via a rounded corner.

7. The electrode member according to claim 1, wherein a gap is kept between the welding region and the first portion.

8. The electrode member according to claim 7, wherein the electrode member further comprises an insulating layer, the insulating layer is provided in the gap.

9. The electrode member according to claim 1, wherein the conductive structure extends beyond the second portion at a side away from the first portion.

10. An electrode assembly, comprising a first electrode member, a second electrode member and a separator which are stacked, the separator being provided between the first electrode member and the second electrode member;
    the first electrode member comprising an electrode body and a conductive structure;
    the electrode body being a laminated structure and comprising an insulating substrate and
    two conducting layers provided on two opposite surfaces of the insulating substrate;
    each conducting layer comprising a first portion and a second portion extending from the first portion, the first portion being coated with an active material, and the second portion being not coated with the active material;
    the second portion comprising a main portion and a transition portion, the transition portion being provided between the main portion and the first portion, and a width of the transition portion being larger than a width of the main portion; and
    the conductive structure being welded with the second portion and extending along a direction away from the first portion, and at least a part of a welding region formed by the second portion and the conductive structure being positioned at the transition portion.

11. The electrode assembly according to claim 10, wherein the electrode assembly is formed by laminating or winding the first electrode member, the second electrode member and separator.

12. The electrode assembly according to claim 10, wherein
    the first electrode member is provided with a plurality of the second portions and a plurality of the conductive structures, each second portion is connected with the conductive structure;
    the second portions and the conductive structures of the first electrode member are stacked and form a first electrode tab.

13. The electrode assembly according to claim 10, wherein
    the welding region comprises a first welding region and a second welding region, the first welding region is positioned at the main portion, the second welding region is positioned at the transition portion;
    a width of the second welding region is larger than a width of the first welding region.

14. The electrode assembly according to claim 10, wherein the second portion is a stepped structure, the main portion is provided to a small end of the stepped structure, and the transition portion is provided to a large end of the stepped structure.

15. The electrode assembly according to claim 10, wherein the conductive structure extends beyond the second portion at a side away from the first portion.

16. A secondary battery, comprising a case, a cap plate, a first electrode terminal, a second electrode terminal and an electrode assembly;
    the cap plate covering the case;
    the first electrode terminal and the second electrode terminal being provided to the cap plate;
    the electrode assembly being provided in the case;
    the electrode assembly comprising a first electrode member, a second electrode member and a separator which are stacked, the separator being provided between the first electrode member and the second electrode member;
    the first electrode member being connected with the first electrode terminal, and the second electrode member being connected with the second electrode terminal;
    the first electrode member comprising an electrode body and a conductive structure;
    the electrode body being a laminated structure and comprising an insulating substrate and
    two conducting layers provided on two opposite surfaces of the insulating substrate;
    each conducting layer comprising a first portion and a second portion extending from the first portion, the first portion being coated with an active material, and the second portion being not coated with the active material;

the second portion comprising a main portion and a transition portion, the transition portion being provided between the main portion and the first portion, and a width of the transition portion being larger than a width of the main portion; and the conductive structure being welded with the second portion and extending along a direction away from the first portion, and at least a part of a welding region formed by the second portion and the conductive structure being positioned at the transition portion.

17. The secondary battery according to claim 16, wherein the first electrode member is provided with a plurality of the second portions and a plurality of the conductive structures, each second portion is connected with the conductive structure;

the second portions and the conductive structures of the first electrode member are stacked and form a first electrode tab; and the first electrode tab is connected with the first electrode terminal.

18. The secondary battery according to claim 16, wherein the secondary battery further comprises a current collecting member, the current collecting member connects the conductive structure and the first electrode terminal.

19. The secondary battery according to claim 16, wherein the welding region comprises a first welding region and a second welding region, the first welding region is positioned at the main portion, the second welding region is positioned at the transition portion;

a width of the second welding region is larger than a width of the first welding region.

20. An apparatus, comprising a secondary battery according to claim 16, wherein the secondary battery is adapted to provide power for the apparatus.

* * * * *